United States Patent [19]

Taubert

[11] Patent Number: 4,917,555
[45] Date of Patent: Apr. 17, 1990

[54] JOINING ELEMENT FOR TWO MACHINE PARTS OF COMPONENTS, SUCH AS A FIT-STRETCH FASTENER AND FIT-STRETCH BOLT

[75] Inventor: Hubert Taubert, Neuwied, Fed. Rep. of Germany

[73] Assignee: Friedr. Boesner GmbH, Fed. Rep. of Germany

[21] Appl. No.: 384,864

[22] Filed: Jul. 21, 1989

Related U.S. Application Data

[63] Continuation of Ser. No. 70,907, Jul. 8, 1987, abandoned, which is a continuation of Ser. No. 632,448, Jul. 19, 1984, abandoned.

[30] Foreign Application Priority Data

Sep. 2, 1983 [DE] Fed. Rep. of Germany ... 8325206[U]

[51] Int. Cl.4 .............................................. F16B 35/04
[52] U.S. Cl. ................................... 411/411; 411/168; 411/916
[58] Field of Search ............... 411/579 R, 579 E, 378, 411/411, 412, 424, 423, 916, 168

[56] References Cited

U.S. PATENT DOCUMENTS

| 2,407,586 | 9/1946 | Summers | 411/916 X |
| 3,455,587 | 7/1969 | Gallois | 411/411 X |
| 3,630,253 | 12/1971 | Sherman | 411/180 X |
| 3,661,406 | 5/1972 | Mele | 403/408 |
| 4,018,132 | 4/1977 | Abe | 411/413 |

FOREIGN PATENT DOCUMENTS

| 2233560 | 2/1973 | Fed. Rep. of Germany | 411/424 |
| 2516734 | 11/1975 | Fed. Rep. of Germany | 411/378 |
| 1962116 | 2/1979 | Fed. Rep. of Germany | 74/579 E |
| 2151543 | 4/1973 | France | |
| 414026 | 6/1946 | Italy | 411/424 |
| 536341 | 12/1976 | U.S.S.R. | 411/411 |

Primary Examiner—Rodney M. Lindsey
Attorney, Agent, or Firm—Toren, McGeady & Associates

[57] ABSTRACT

The joining element comprising a fastener or screw shank having a head has adjacent to said head a portion with a plurality of parallel, concentric fit-stretch rings, whose external diameter is 0.1 to 0.5 mm larger than the external diameter of the fastening thread. A fit slot is formed between in each case two rings, with a notch groove radius which is two to three times the top radius of the fastening thread. In the transition region between the head and the aforementioned portion is provided a fillet with a rounded portion having a diameter corresponding roughly to the pitch diameter of the rings and with a radius of curvature amounting to approximately to 0.1 to 0.15 times the external diameter. The rings have a stressing cross-section in the notch groove corresponding to the stressing cross-section of the fastening thread. The top width of the rings approximately corresponds to the side width of the preliminary shape of the rings.

5 Claims, 6 Drawing Sheets

JOINING ELEMENT FOR TWO MACHINE PARTS OF COMPONENTS, SUCH AS A FIT-STRETCH FASTENER AND FIT-STRETCH BOLT

This is a continuation of Ser. No. 07/070,907 filed July 8, 1987, which is in turn a continuation of Ser. No. 06/632,448, filed July 19, 1984, now both abandoned.

BACKGROUND OF THE INVENTION

The invention relates to a fastening element for two machine parts or components, such as a fit-stretch fastener and fit-stretch bolt.

Under cyclic loads or stresses, screws mainly fracture in the first stressed turn of the thread or under the head. The greatest cyclic loading which can be withstood by a material without fracturing is designated as the fatigue strength as follows:

$$\delta_D = \delta_M \pm \delta_A$$

in which
- $\delta_D$ = fatigue strength
- $\delta_M$ = mean static stress or prestress
- $\delta_A$ = variable stress component.

The maximum allowable continuous variable stress component is $\delta_A = 60$ N/mm² for steel screws with a strength of 800 to 1200 N/mm² and $\delta_A = 100$ N/mm² for very high-strength screws of 1300 to 1400 N/mm². This variable stress component is substantially independent of the prestress and the steel quality.

Knowledge of the influence of the elasticity relationship between the screw and the parts braced by it makes it possible to reduce the variable stress component acting on the screw. In the case of given cyclic stressing of a screw or bolt connection, the proportion of the cyclic load (variable stress component $\delta_A$) acting on the thread decreases as the screw resilience becomes softer and as the connected parts of a joint become harder and stiffer.

Due to the high demands, such as for internal combustion engines of vehicles, the rotational speeds and piston speeds are increased. This leads to increased stressing of the bolts, including those bolts and/or screws forming the connection between the connecting rod base and the connecting rod cap. For example, in the case of connecting rod bolts, the latest legal requirements are for higher and more restricted tensile strength, e.g. $\delta_b = 1100$ to 1200 N/mm²; 1200 to 1300 N/mm² and 1300 to 1400 N/mm² with a prestress of approximately 90% and higher for the elastic limit $\delta_s$.

Thus, a product has been developed for fastening together the two parts such as the connecting rod cap and base with a very high prestress in the elastic limit range of the bolt.

These requirements are satisfied by the choice of suitable material qualities and heat treatment processes, in order to obtain higher quality levels with improved elasticity characteristics and high strength. In addition, the elastic expansion must be increased by geometrical changes to the bolt.

As a result of this, a stretch bolt or fastener has been developed, which is used in the case of bolted connections exposed to permanent alternating stresses and has a thin shank, and is very elastically resilient, so that the fatigue fracture risk of the connection is reduced. This stretch fastener has a shank part with a reduced diameter, which corresponds to approximately 90% of the core diameter. The fastener is additionally provided with one or two sets of fits which cooperate with associated tolerances of the bore and having a diameter exceeding the external diameter of the fastener thread, while located in the vicinity of the center of the bolt or, optionally in the vicinity of its head. The fastener thread is located at the opposite end from the head.

Known stretch fasteners suffer from the following shortcomings. The static load carrying capacity of the stretch fastener is not the same over the entire length thereof as a result of the tapered shank. In addition, due to the diameter differences on the shank (reduced shank diameter, snug fit), the stretch fastener has discontinuities in the elongation or stretch characteristics towards the core, which prevent a uniform elastic stretching over the entire fastener length. Moreover, during cyclic stressing and due to the tranverse forces which develop and the vibration in the stretch fastener, there occurs on a closely fitting surface, corrosion at the cylindrically fitted seat in the bore resulting in a mating surface corrosion, which causes a molecular interface destruction.

Figure 6:
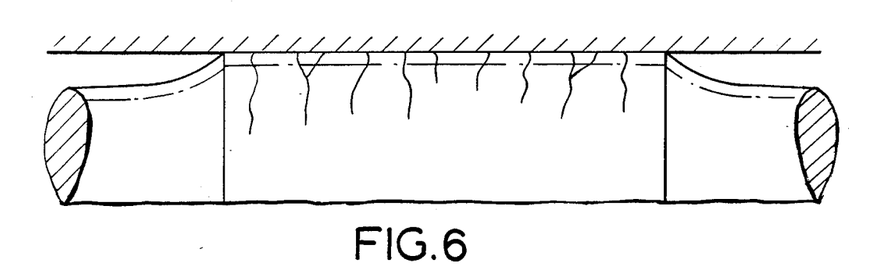
FIG. 6 shows the path of lines of force in the case of a cylindrical close fit.

This mating surface corrsosion leads to surface cracks (FIG. 6) and to fractures, which lead to serious damage to the engine. Small amplitude but high frequency waves, such as microwaves, generated by small amplitude relative movements of the fitted parts, cause local overheating and operation of the surface crystals. These hot oxide particles act in the same way as an abrasive medium and cause cracks and serious damage to the mating surfaces with ensuing fracture.

A further disadvantage is the complicated and uneconomic manufacturing method involving machining operations, such as turning and grinding during the production of fitted fasteners.

SUMMARY OF THE INVENTION

The present invention provides an improved fastening element, such as a stretch-fit fastener or bolt having a high strength. A fitted or notch groove located between two concentric stretch-fit rings and the core of the fastening thread of the fastener cooperate with one another so that in the case of the fastener or bolt, the elastic stretching or expansion caused by the tensile stressing of the stretch-fit fastener or bolt does not result in elongation discontinuities or fissures in the threaded shank during elastic elongation due to tensile stress in the fitted threaded bolt. In addition, an accurate fit is insured with respect to the bore in a workpiece, machine part or component, such as a connecting rod or the like and a tight coaxial tolerance between the fastening thread and the fit diameter at the crest of the fit-stretch or concentric fitted antifatigue rings.

According to the invention, this problem is solved by a fastening element of the aforementioned type, constructed in such a way that, adjacent to its head, the fastener shank has a portion with a plurality of parallel concentric fit-stretch or concentric fitted antifatigue rings with a concentric fit groove formed between each two such rings, the fastening thread is connected to the portion with the concentric fit-stretch rings, the external diameter of the concentric fit-stretch rings is 0.1 to 0.5 mm larger according to $$d_{conc.\ rings} > d_1$$

than the outside diameter of the fastening thread. In the transition zone from the fastener head to the portion with the concentric fit-stretch rings, there is a fillet with a rounded portion having a diameter approximately corresponding to the pitch diameter of the concentric fit-stretch rings. The radius of curvature is approximately 0.1 to 0.15 times the external diameter of the concentric fit-stretch rings and have a stressing cross-section in the fillet corresponding to the grooves at the concentric fit-stretch rings [$A_{conc.\ rings}$] which also correspond to the stressing cross-section of the fastening thread [$A_s$]

$$A_s = A_{conc.\ rings}.$$

The radius in the fillet $$R_{conc.\ rings} \approx 2-3 R_{wt}.$$

is two to three times the radius of the fastening thread or has a double radius which is each two to three ties the radius of the core or root of the fastening thread $$R_{conc.\ rings} \approx 2-3 R_{wt}.$$

The crest width of the concentric fit-stretch rings approximately corresponds to the width of the preliminary shape of the fit-stretch rings for obtaining an appropriate size of the zero-clearance contact surface between the fit-stretch fastener and the close tolerance bore on increasing the wear resistance.

In another embodiment of the fastening element, such as a fit-stretch bolt, for connecting two machine parts or components, the element has an intermediate shank with parallel concentric fit-stretch rings. One end of the element has a drive fitting. A fastening thread is located on either side of the intermediate shank portion with a guide pin on one end. A snug fit thread on one side, along with the guide pin brings about an initial stressing force in the snug fit thread after screwing in a tapped hole. Adjacent to its fitting drive, the fastener has a threaded portion with the guide or counterpressure pin at its other end. Between the two threaded portions there is a portion with a plurality of parallel concentric fit-stretch rings with a concentric fit slot or groove formed between each two rings. The external diameter of the concentric fit-stretch rings is 0.1 to 0.5 mm larger according to $$d_{conc.\ rings} > d_1$$

than the external diameter of the two fastening threads. The concentric fit-stretch rings have a stressing cross-section [$A_{conc.\ rings}$] which corresponds to the stressing cross-section $A_s$ of the two fastening threads according to

$$A_s = A_{conc.\ rings}$$

the radius of the groove being two to three times the radius in the core of the fastening thread. Alternatively, the groove has a double radius which is two to three times the radius of the core of the fastening thread $$R_{conc.\ rings} \approx 2-3 R_{wt}.$$

and the crest width of the concentric fit-stretch rings approximately corresponds to the width of the preliminary shape of the fit-stretch rings. As a result, an appropriate size is obtained from the zero-clearance contact surface between the fit-stretch fastener and the fit bore.

Figure 9:
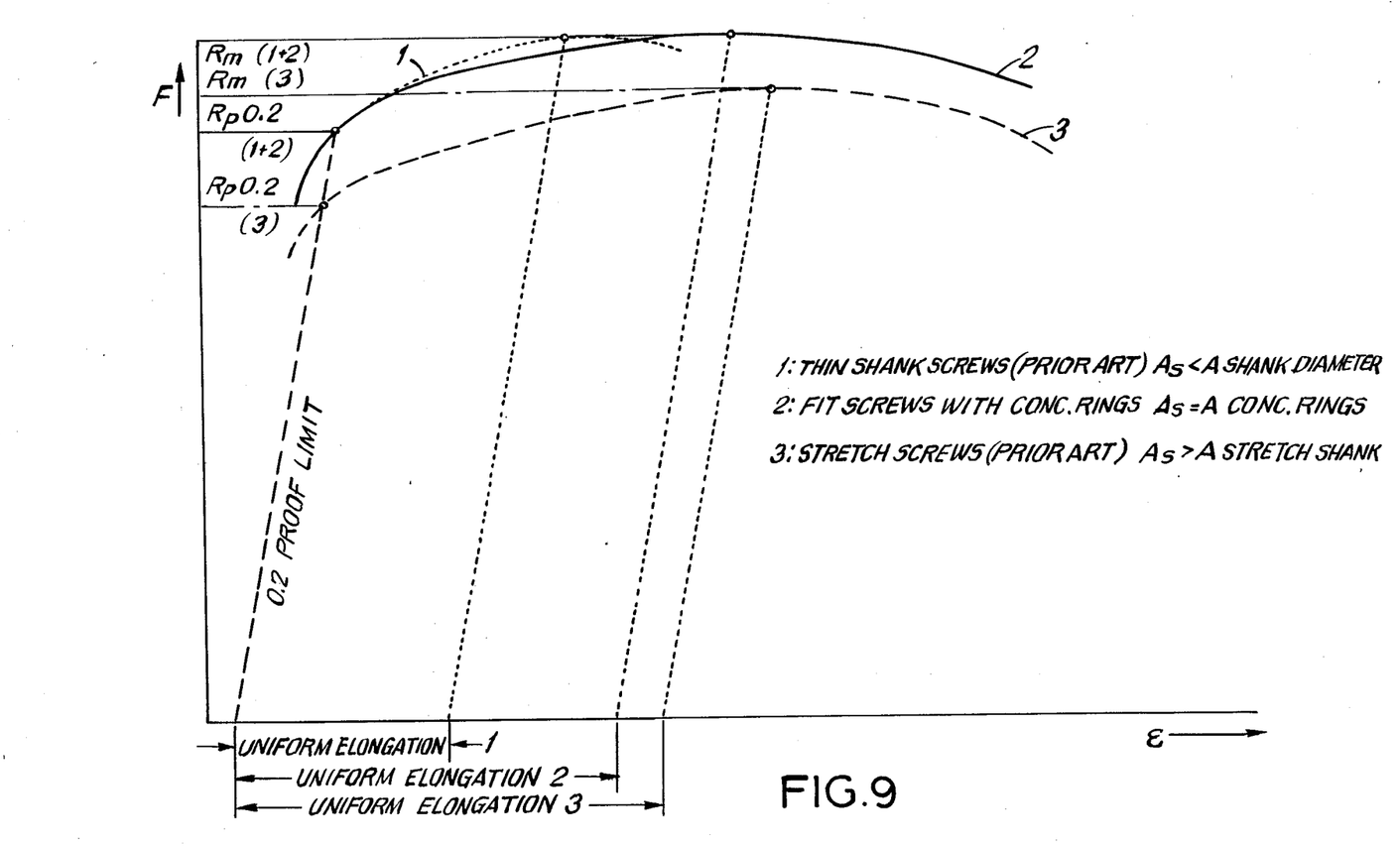
FIG. 9 is a $\delta - \Sigma$ diagram of connecting rod bolts with curves for think shank bolts, and fit-stretch bolts or fasteners with concentric fit-stretch rings and stretch screws.

This leads to a fastening element, such as a fit-stretch bolt which, due to the identical stressing cross-sections of the fastening thread and the concentric fit-stretch rings $$A_s = A_{conc.\ rings}$$

as compared with the conventional stretch bolt or fastener $$A_{s\ stretch\ shank} = 90\% A_s$$

has a very high tensile strength with large uniform elongation, as can be gathered from the $\delta - \Sigma$ diagram of connecting rod bolts of FIG. 9, in which 1 is the curve for thin shank bolts or fasteners $$A_s < A_{shank\ diameter}$$

2 is the curve for fit bolts or fasteners $$A_s = A_{conc.\ ring}$$

and 3 is the curve for stretch fasteners $$A_s > A_{stretch\ shank}$$

In addition, parallel concentric fit-stretch rings, also produced by tapping rolls or rollers, are arranged in the central area of the fastener shank, following the fastening thread and up to the fillet below the head.

The external diameter of the concentric fit-stretch rings, measured over the top, is 0.1 to 0.5 mm larger than the external diameter of the fastening thread according to $$d_{conc.\ rings} > d_1$$

i.e., the fit diameter of the concentric fit-stretch rings is 0.1 to 0.5 mm larger than the nominal diameter of the fastening thread.

The stress cross-section of the base of the groove of the concentric fit rings [$A_{conc.\ rings}$] is the same as the stressing cross-section of the fastening thread [$A_s$]

$$A_s = A_{conc.\ rings}.$$

Figure 10:
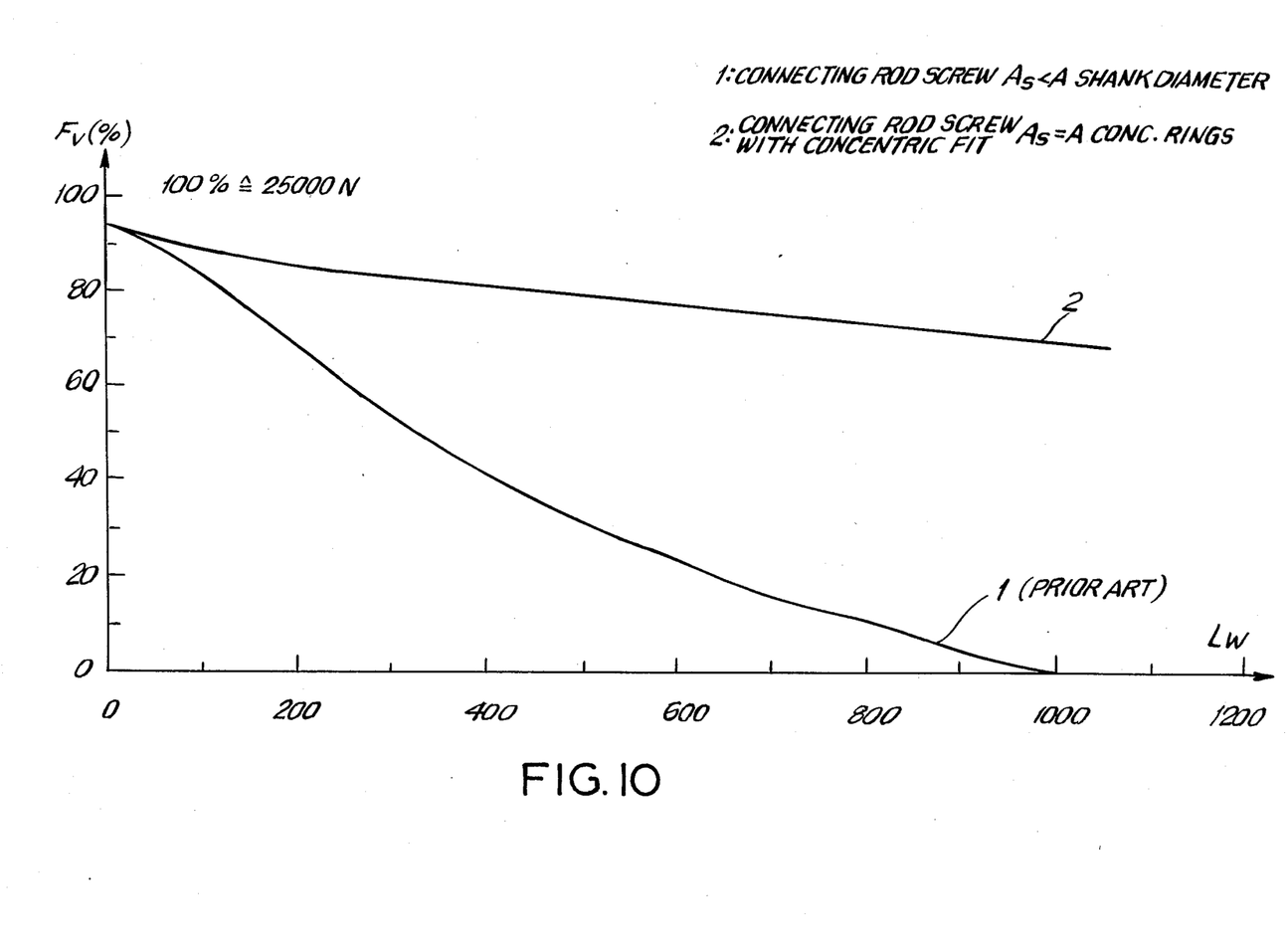
FIG. 10 displays the course of the curve of a connecting rod bolt and such a bolt with concentric fit-stretch rings as a result of tests carried out on threaded couplings or connections to establish any loosening by vibration.

Thus, the concentric slots of the fit-stretch rings and the core of the fastening thread cooperate so that there is no stretch openings in the bolt shank during the elastic elongation of the fit-stretch fastener caused by tensile stressing and consequently there is increased resistance to vibration and improved durability (FIG. 10). In addition, there is an increase in the uniform elongation. The radius in the fillet of the concentric fit-stretch rings is two to three times the radius of the core in the fastening thread, or it may be formed with a double radius which is two to three times the radius of the core of the fastening thread.

The crest width of the concentric fit-stretch rings is approximately the same as the preliminary shape for the fit-stretch rings. This stabilizes the zero-clearance contact with the fit bore, which leads to an increase in the wear resistance.

The final operation in producing the concentric fit-stretch rings is an equalizing or smoothing rolling process combined with the rolling of the fastening threads, in order to ensure their coaxiality. This ensures both the precise fit with respect to the fit bore, i.e. in the case of a connecting rod, and the necessary tight coaxial tolerance between the fastening thread and the fit diameter on the crest of the concentric fit-stretch rings.

The combined tapping and equalizing rolling process for producing the fastening thread and the external diameter of the concentric fit-stretch rings is carried out in the heat-treated state. This leads to an increase in the durability as a result of the initiated superficial strain hardening of the thread.

In the case of fit-stretch bolts with the same or different thread dimensions on either end, a fitting piece with parallel concentric fit-stretch rings is arranged between the threads, which have a geometry or configuration and manufacture as defined hereinbefore.

In the known production methods, the bolt or screw shank used as the starting material has a larger diameter during cold working. During subsequent, metal cutting operation, the forming of the reduced shank diameter and the rounded portion of the fillet under the head are produced by turning and the close fit by grinding. These costly metal-removing operations are not necessary during production of the fastening elements according to the invention.

Figure 7:
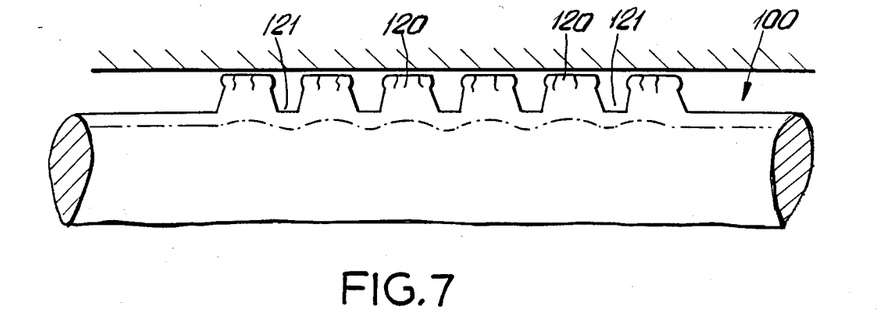
FIG. 7 shows the path of the lines of force in the case of concentric fit-stretch rings.

As a result of the parallel concentric fit-stretch rings, elastic stretching or elongation takes place uniformly over the entire bolt without any openings, discontinuities or cracks and the protection against vibration of the connection and the durability of the fastener bolt are considerably increased so that engine damage due to fractures or cracks to the connecting rod fastening bolts is avoided, as can be seen in FIG. 10, in which the curves represent the results of tests carried out on threaded couplings to determine any loosening by vibration. Difficulties due to mating surface corrosion are also avoided and which otherwise occur due to the relative movement between the fit bore and the cylindrical snug fit as a result of molecular interface damage and destruction (FIG. 7).

The spaced outwardly directed annular ribs are separated by U-shaped cylindrical notches. The snug fit of the bolt with the fit bore is in each case interrupted, so that relative movements of the fit connecting parts are broken off and stopped. In addition, the force lines of the prestressed bolt do not extend up to the fit surface, and are further removed from the cylindrical contact plane and the fillet of the concentric fit-stretch rings. Incipient slight surface cracks which would form on the crest of the concentric fit-stretch rings do not reach the force lines of the prestressed bolt and consequently have no further effect.

Fit-stretch fasteners or bolts with the following characteristics are obtained:

no stretching or elongation discontinuities or cracks over the clamped length, increase of the uniform elongation with high strength in the $\delta - \Sigma$ diagram, a more reliable threaded coupling in the yield strength range is ensured by increasing the uniform elongation with high strength, due to identical stressing cross-section $A_s = A_{conc.\ rings}$ a higher tensile strength is obtained than in the case of conventional stretch fasteners:

$$A_{stretch\ shank} = 90\%\ A_s$$

higher tensile strength due to the geometry of the fit-stretch rings leading, under prestress to surface strengthening in the notch groove of the concentric fit-stretch rings, and bending-soft leading to greater protection against vibrations and consequently improved durability.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figures 1, 1A:
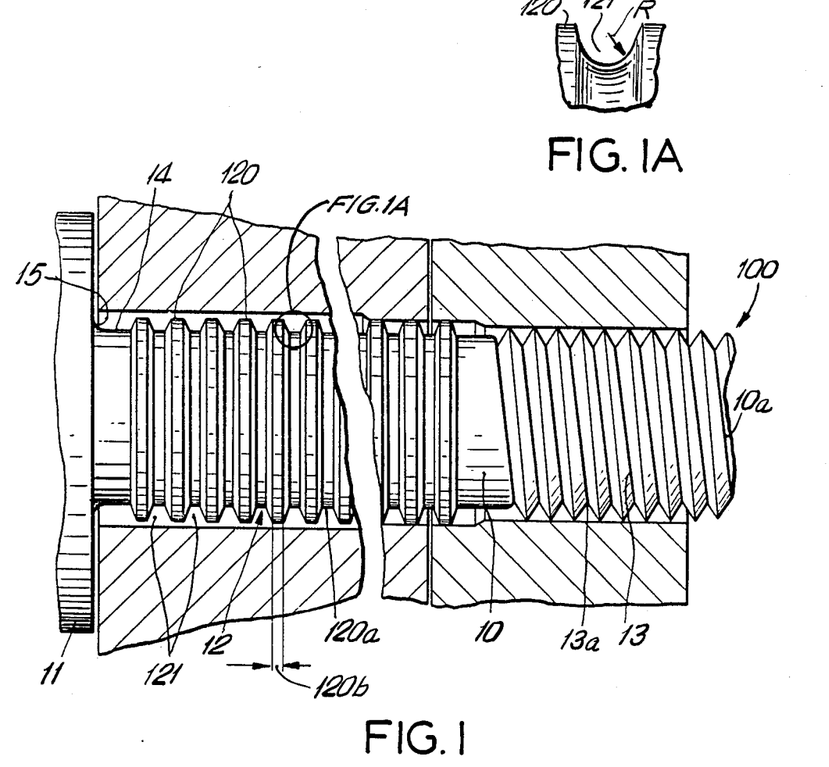
FIG. 1 is an enlarged scale side view of a fit-stretch fastener arranged in a workpiece.
FIG. 1A is a detail view of a fit groove in the fit-stretch fastener.
Figure 2:
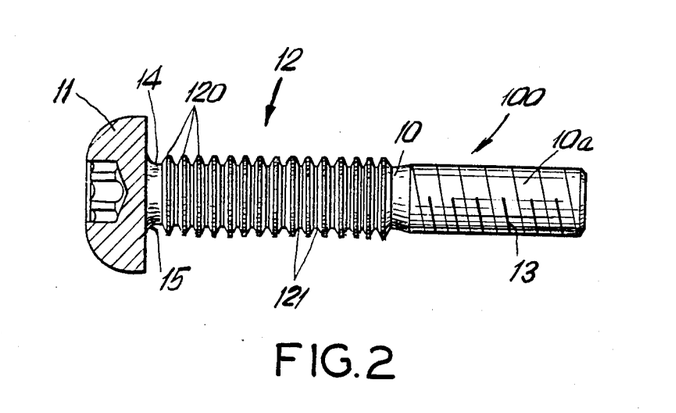
FIG. 2 is a side view of the fit-stretch fastener.
Figure 3:
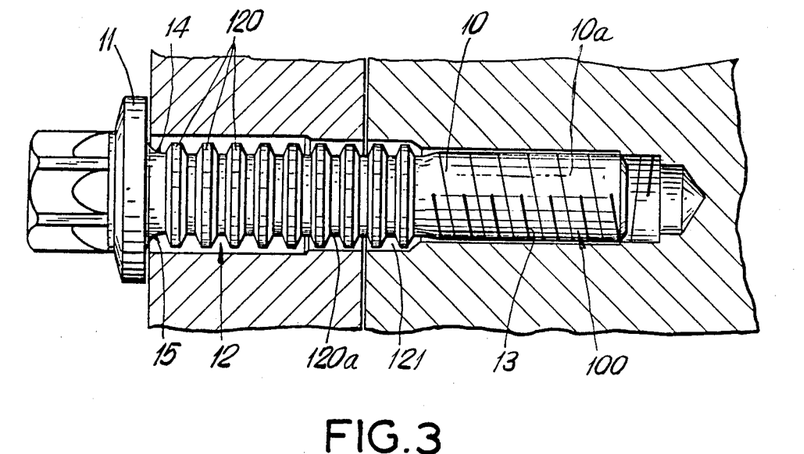
FIG. 3 is partly in side view and partly in vertical section, with the fit-stretch fastener located in a fit bore of a workpiece.
Figure 4:
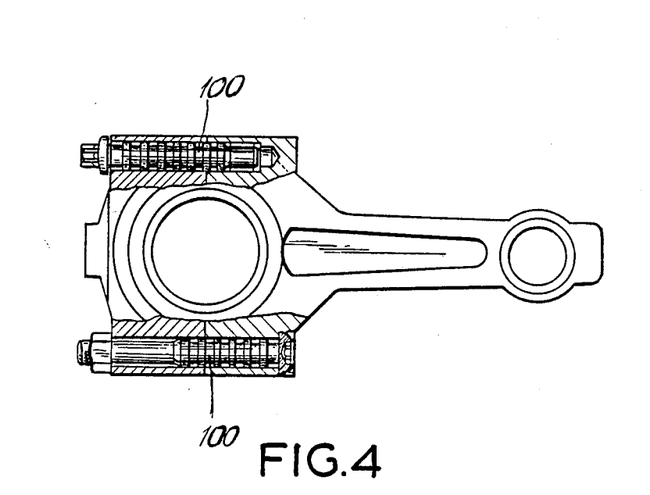
FIG. 4 is partly in elevation and partly in section, and illustrates a connecting rod with the fit-stretch fastener connecting its head or cap base.

The fit-stretch fastener 100 shown in FIGS. 1 to 3 comprises a fastener shank 10 with a head 11 shaped onto one end thereof. In the vicinity of its head, shank 10 is provided with a portion 12, which has a plurality of parallel concentric fit-stretch rings 120. The concentric fit groove formed between each two fit-stretch rings is designated 121 and the root or core diameter of the groove is designated 120a (FIGS. 1 to 3). A detail of the fit groove 121 is set forth in FIG. A.

To the portion 12 with concentric fit-stretch rings 120 is connected a fastening thread 13, constructed in per se known manner and which extends up to the end 10a of shank 10 of fit-stretch fastener 100.

In the transition zone from the bolt or fastener head 11 to portion 12 with the concentric fit-stretch ring 120, a fillet 14 is provided with a rounded portion 15 (FIG. 1). The diameter of fillet 14 is approximately the same as the pitch diameter of the concentric fit-stretch rings 120. The radius of curvature of the rounded portion 15 of fillet 14 is 0.1 to 0.15 times the external diameter of fastening thread 13.

Figure 8:
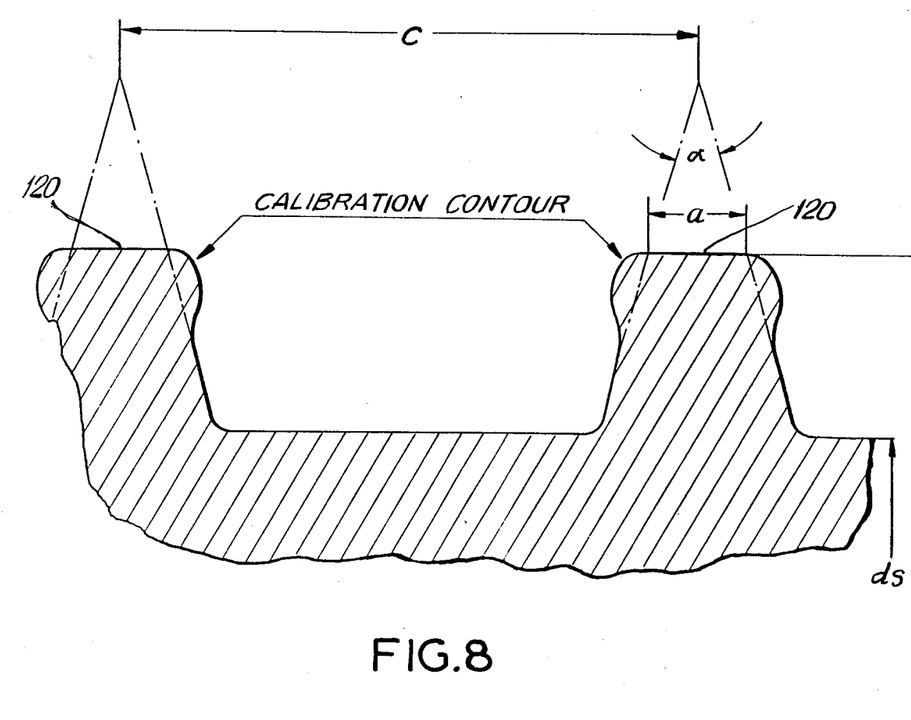
FIG. 8 is a vertical section, and illustrates a portion of the fit-stretch fastener where the crest width of the concentric fit-stretch rings approximately corresponds to the width of the preliminary shape of said rings.

The concentric fit-stretch rings 120 have a stressing cross-section in the base of the fit grooves 121, indicated in FIG. 1 [$A_{conc.\ rings}$] as 120a and which corresponds to the fit stressing cross-section [$A_s$] designated 13a in FIG. 1 at the root of the fastening thread 13. The radius at the notch groove 120a is two to three times the radius of the core of the fastening thread. Alternatively, it has a double radius which is two to three times the radius of the core or root of the fastening thread. The crest width indicated at 120b in FIG. 1, of the concentric fit-stretch rings 120 approximately corresponds to the initial width of the preliminary shape of the fit-stretch rings (FIGS. 1 and 8).

The external diameter of the concentric fit-stretch rings is 0.1 to 0.5 mm larger than the external diameter of the fastening thread.

Figure 5:
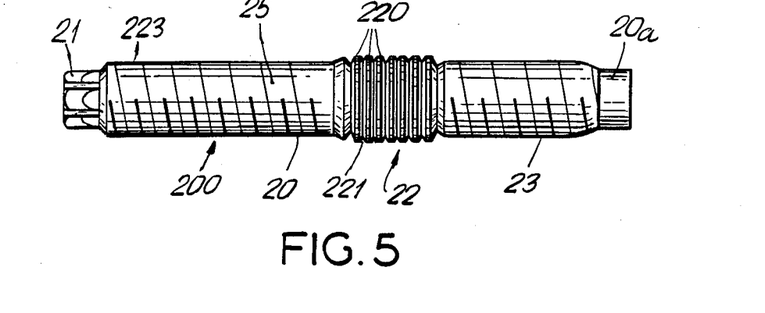
FIG. 5 is another embodiment of a fit-stretch bolt or fastener.

The fit-stretch bolt 200 of FIG. 5 has a bolt body 20 with a drive fitting 21 formed at one end. Adjacent to its drive fitting 21, bolt body 20 has a portion with a fastening thread 223 and in its opposite end region 20a spaced from fastening thread 223 it has another portion with a fastening thread 23, which is normally constructed as a snug fit thread (e.g. POWERLOK thread) for thread locking screws and is provided with a guide or counterpressure pin 20a.

The guide pin 20a connected to the snug fit fastening thread 23 also serves as a mounting or counterpressure pin following screwing of the fit-stretch bolt into a tapped hole. Thus, apart from the friction torque of the snug fit thread, there is a prestressing force between the thread and the opposite thread in the bore, so that the bolt is additionally anchored in a component, before the second component is screwed to the fastening thread giving further prestressing by tension.

The driving force for screwing the fit-stretch bolt or fastener with the snug fit thread in a component is provided both by a hexagonal or TORX drive system (as shown for driving fasteners) at the end of the fastening thread or can be provided by means of a special screwdriver. Slight damage to the fastening thread must be expected. Therefore, the drawing shows the TORX drive system, which is superior to the hexagonal drive system.

Between the two threaded portions 23, 223 is provided a portion 22 with a plurality of parallel, concentric fit-stretch rings 220, and a fit groove 221 with a base or root being provided between each two such rings.

The concentric fit-stretch rings 220 have a stressing cross-section [$A_{conc.\ rings}$] which corresponds to the stressing cross-section [$A_s$] of the thread of the two threaded portions 23, 223, the radius in the notch groove of slots 221 is two to three times the radius of the core or root of threads 23, 223. Alternatively, the root of groove 221 can have a double radius which is two to three times the radius of the core or root of the fastening thread.

FIG. 10 shows the results of tests carried out on the threaded connections with respect to loosening by vibration for a connecting rod screw M8×1×40.5 (curve 1) and a connecting rod bolt or fastener with concentric fit-stretch rings M8×1×42 (curve 2).

I claim:

1. An axially extending fastening element for interconnecting two machine parts or components, said fastening element comprising a fit-stretch fastener having an axially elongated shank with a head at one end thereof, wherein the improvement comprises that said shank includes an axially extending section with a plurality of parallel concentric fitting rings having an outer diameter and extending around said shank with a concentric fitting groove located between and spacing each pair of adjacent said fitting rings, an axially extending fastening thread extending from at least one end of said section with the fitting rings, said fastening thread having a core forming a stressing cross-section, said fitting rings having a root diameter with a stressing cross-section defined by the root diameter within the fitting grooves and the stressing cross-section of said fitting rings equal to the stressing cross-section of the core of the fastening thread, the fitting grooves having a surface extending in the axial direction at the root thereof with at least one radius two to three times an axially extending radius defined by the fastening thread, and each said fitting ring having a crest at the outer diameter thereof with a width approximately corresponding to a width at the pitch diameter of a preliminary shape of the fitting rings of the fastening element, said fastening thread has an outside diameter and the outer diameter of the fitting rings is in the range of 0.1 to 0.5 mm larger than the outside diameter of said fastening thread.

2. A fastening element, as set forth in claim 1, wherein an axially extending fillet forms a transition from said head to said shank, said fillet having an axially extending rounded portion extending from said head toward said fitting rings, said fillet having an end spaced from said head with a diameter corresponding to the pitch diameter of the fastening thread, and said rounded portion having a radius of curvature approximately 0.1 to 0.15 times the outer diameter of said fitting rings.

3. A fastening element, as set forth in claim 1, wherein said head includes means for driving said fastening element into a bore, one said fastening thread extending between said head and said fitting rings and another said fastening thread extending from the opposite side of said fitting ring more remote from said head.

4. A fastening element, as set forth in claim 3, wherein a guide pin is located at the end of said another fastening thread spaced from said fastening rings.

5. A fastening element, as set forth in claim 4, wherein an axially extending section free of fastening threads and fitting rings is located between said fitting ring and said fastening thread extending from said head toward said fitting rings.

* * * * *